United States Patent
Koren

(10) Patent No.: US 10,739,589 B2
(45) Date of Patent: Aug. 11, 2020

(54) VEHICLE WINDOW ADAPTED FOR AUGMENTED REALITY PROJECTION

(71) Applicant: Doron Koren, Kfar Sirkin (IL)

(72) Inventor: Doron Koren, Kfar Sirkin (IL)

( * ) Notice: Subject to any disclaimer, the term of this patent is extended or adjusted under 35 U.S.C. 154(b) by 46 days.

(21) Appl. No.: 16/207,098

(22) Filed: Dec. 1, 2018

(65) Prior Publication Data

US 2019/0171008 A1 Jun. 6, 2019

Related U.S. Application Data

(63) Continuation of application No. 62/593,864, filed on Dec. 1, 2017.

(51) Int. Cl.
| | | |
|---|---|---|
| *G02B 27/01* | (2006.01) | |
| *G02F 1/15* | (2019.01) | |
| *G02B 5/23* | (2006.01) | |
| *G02F 1/01* | (2006.01) | |
| *E06B 9/24* | (2006.01) | |
| *G02F 1/157* | (2006.01) | |
| *G02F 1/1524* | (2019.01) | |
| *B60J 1/08* | (2006.01) | |

(52) U.S. Cl.
CPC .......... *G02B 27/0101* (2013.01); *E06B 9/24* (2013.01); *G02F 1/0126* (2013.01); *B60J 1/08* (2013.01); *E06B 2009/2417* (2013.01); *E06B 2009/2464* (2013.01); *G02B 5/23* (2013.01); *G02B 2027/0118* (2013.01); *G02F 1/157* (2013.01); *G02F 1/1524* (2019.01)

(58) Field of Classification Search
CPC ........ G02B 27/0101; G02B 2027/0118; G02B 2027/012; G02B 5/23; G02F 1/15; G02F 1/1524; E06B 9/24; E06B 2009/2417; E06B 2009/2464
See application file for complete search history.

(56) References Cited

U.S. PATENT DOCUMENTS

| | | | | |
|---|---|---|---|---|
| 2012/0242724 A1* | 9/2012 | Kurozuka | ............ | G02B 27/01 345/697 |
| 2017/0045737 A1* | 2/2017 | Cammenga | ............ | B60K 35/00 |

* cited by examiner

*Primary Examiner* — Ryan D Howard
(74) *Attorney, Agent, or Firm* — Mark Young, P.A.

(57) ABSTRACT

An optical laminate is applied to an interior surface of a window of a vehicle. The optical laminate includes a photochromic layer, a semi-reflective film comprised of a substrate coated with a reflective material, and a micro-lens array. The semi-reflective layer is disposed between the photochromic layer and the micro-lens array. The photochromic layer is disposed between the surface of the window and the semi-reflective film. A projected image comprised of incoherent light reflects from the optical laminate to a vehicle occupant.

18 Claims, 5 Drawing Sheets

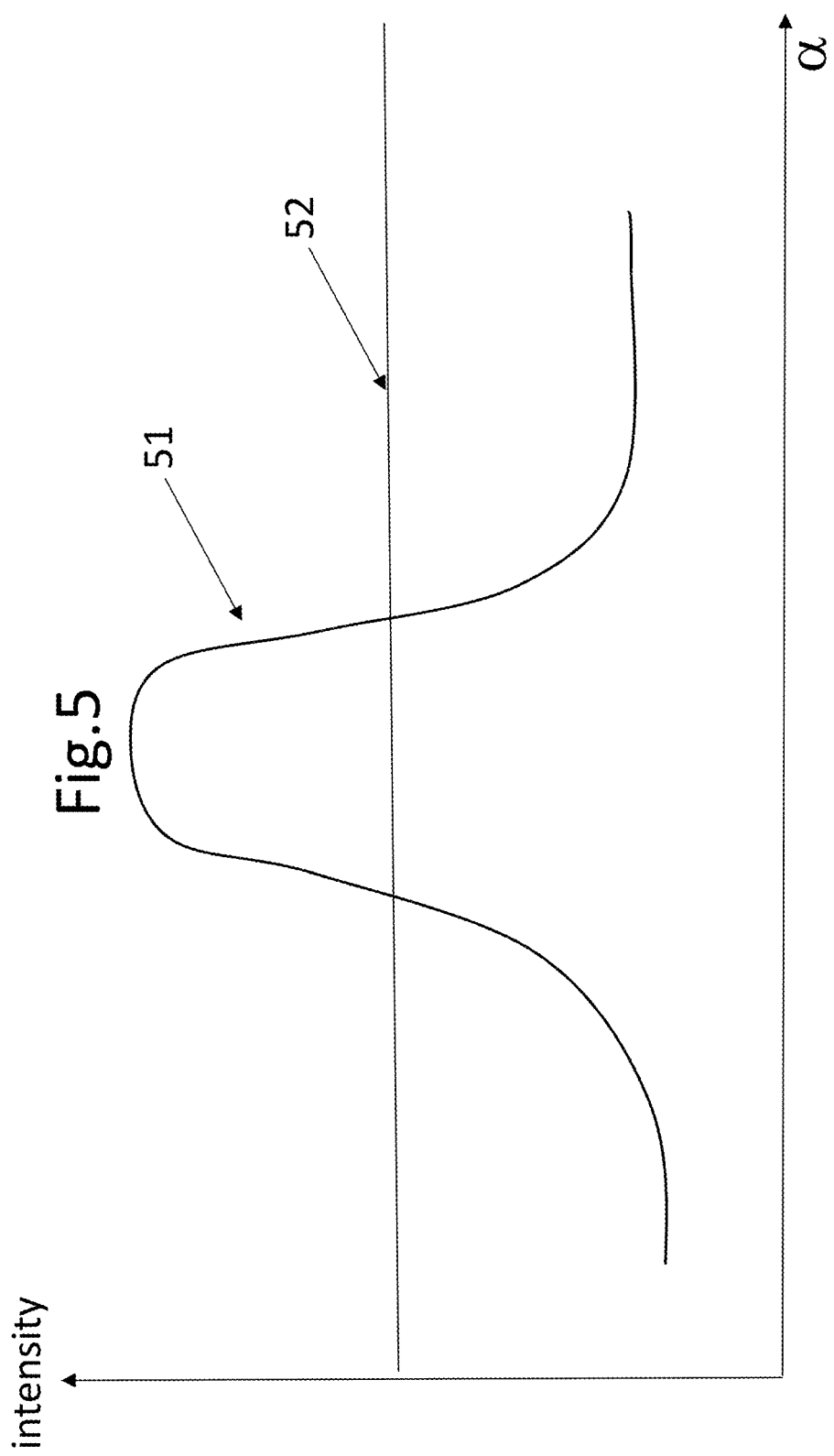

VEHICLE WINDOW ADAPTED FOR AUGMENTED REALITY PROJECTION

RELATED APPLICATION

This application is a nonprovisional and claims the benefit of priority of U.S. Provisional Application 62/593,864, filed Dec. 1, 2017, the entire contents of which are incorporated herein by this reference.

FIELD OF THE INVENTION

This invention relates generally to motor vehicles, and, more particularly, to an adaptation for vehicle windows to display projected images while allowing an occupant to see through the window.

BACKGROUND

Current systems and methods of displaying information to vehicle occupants are limited to electronic (e.g., LCD, LED) displays and heads-up displays, with electronic displays predominating. Commercially available electronic displays limit the amount and quality of the displayed content, limit visibility in bright daylight and typically block visibility through the display. Heads-up displays (HUDs) are rarely used in motor vehicles. Some vehicles equipped with a HUD require a combiner (e.g., a beam splitter) located directly in front of the viewer. The combiner redirects (i.e., reflects) towards the viewer some or all of the projected image from a projector. Usually the projector is located in a dashboard, aimed upwardly. The combiner is located in front of the driver. Even while the combiner reflects the projected image towards the viewer, the viewer may see through the combiner and the window behind the combiner. Other HUD systems omit the combiner, but require a specially coated window and laser projector. In such systems, a vehicle window is coated with transparent phosphors that react (i.e., fluoresce) when impinged by projected laser light. When the laser is off, the coated window is transparent. Many such systems require mirrors to project the images on the windshield.

By way of example, one vehicle manufacturer uses windshield glass coated with red-emitting and blue-emitting phosphors—a clear synthetic material that glows when it is excited by ultraviolet light. The phosphor display is activated by ultraviolet lasers bouncing off mirrors bundled near the windshield.

While prior art display systems are useful, they have shortcomings. First, prior art HUD systems cannot be applied directly to installed windows and require costly, complex laser projectors. Second, the various available electronic displays cannot be used over a window. Transparent electronic displays, such as OLEDs, are very costly, very difficult to see in bright sunny ambient conditions, would consume considerable power to "outshine" sunlight on a bright day, and require complex interfaced dedicated display drivers.

What is needed is a means for adapting a conventional vehicle window (e.g., side window or windshield) to display images from a conventional projector that emits incoherent (i.e., non-laser) visible light, while still allowing an occupant of the vehicle to see through the adapted window. The adaptation should be suitable for existing vehicle windows.

The invention is directed to overcoming one or more of the problems and solving one or more of the needs as set forth above.

SUMMARY OF THE INVENTION

To solve one or more of the problems set forth above, in an exemplary implementation of the invention, an image projector and optical laminated structure ("optical laminate") are provided. The optical laminate is applied to the interior side of a window.

The optical laminate includes a photochromatic (i.e., photochromic) layer to attenuate ambient sunlight during the day and keep the window transparent and clear during the night time. Attenuation refers to a reduction of sunlight (i.e., radiation from the sun) transmitted through a window. The photochromic layer includes a photochromic coating that reacts (i.e., darkens) upon exposure to specific types of light of sufficient intensity, most commonly ultraviolet (UV) radiation. The photochromic layer is comprised of inorganic or organic photochromes, such as, but not limited to, silver chloride, spiropyrans, spirooxazines, diarylethenes, azobenzenes, or photochromic quinones.

Optionally, an electrochromic layer may be provided in lieu of a photochromic layer. The electrochromic layer facilitates light control. The electrochromic layer may comprise an electrochrome such as tungsten trioxide, tungstic anhydride or other transition metal oxides, which reversibly change color when undergoing electrochemical redox reactions precipitated by bursts of charge.

The optical laminate also includes a semi-reflective film comprised of a substrate coated with a reflective material (e.g., a metalized film). In one embodiment the substrate is polyethylene terephthalate (PET) and the coating is a thin (almost transparent) layer of aluminum. In another embodiment, the metalization is deposited on the inward facing side of the photochromic layer. The result is a mirrored surface that reflects some light and is penetrated by the rest. Light passes equally in both directions. However, when one side is brightly illuminated by a projector and the other side is darker, the darker side (i.e., the side outside of the window) becomes difficult to see from the reflection on the brightly illuminated side, because the darker side is obscured by the much brighter reflection of the illuminated side. Thus, the semi-reflective film reflects the image projected onto the window.

The optical laminate also includes a micro-lens array layer. The array reflects, via total internal reflection, some of the light arriving from the projector. Total internal reflection occurs when a propagated wave strikes a medium boundary at an angle larger than a particular critical angle with respect to the normal to the surface. If the refractive index is lower on the other side of the boundary and the incident angle is greater than the critical angle, the wave cannot pass through and is entirely reflected. Other light from the projector that passes through the lens is reflected by the semi-reflective film and then focused by the lenses.

The micro-lens array layer is substantially transparent, allowing a viewer to clearly see exterior objects together with projected image. In one embodiment, the layer is comprised of an array of concave lenses etched into a substrate (e.g., a polymer substrate), e.g., by laser etching or a lithographic process. In another embodiment, convex lens dots (e.g., spherical, hemispherical, or bulbous deposits), are formed on a substrate (e.g., a polymer substrate), such as by 3D printing or a lithographic process.

An optical laminate according to principles of the invention reflects energy from the projector, but at some angles the reflected intensity will be less visible. In the vehicle, due to the fact that the passenger locations are known, most of reflected optical energy may be directed towards the expected location of the passenger.

In another embodiment, the microlenses are doped with reflective material (e.g., metalized with an ultra-thin layer of aluminum), in a thin outer layer that allows visibility through the lenses in appropriate lighting conditions, but reflects images from a projector. Un-doped areas may be masked from deposition (e.g., chemical vapor deposition). Micro-lens doping allows defining an angle of maximum energy density. In such an embodiment the projector can be conveniently placed in a vehicle without losing an optimal viewing location.

In sum, in accordance with principles of the invention, an optical laminate is applied to a surface of a window. The optical laminate includes an attenuation layer, a semi-reflective film comprised of a substrate coated with a reflective material, and a micro-lens array. The semi-reflective layer is disposed between the attenuation layer (i.e., a photochromic and/or electrochromic layer or coating) and the micro-lens array. The attenuation layer is disposed between the surface of the window and the semi-reflective film. The photochromic layer may include a photochrome from the group consisting of silver chloride, spiropyrans, spirooxazines, diarylethenes, azobenzenes, and photochromic quinones. The electrochromic layer may include an electrochrome from the group consisting of tungsten trioxide, tungstic anhydride and another transition metal oxide. The semi-reflective layer may include a thin layer of reflective metal on a plastic film. The micro-lens array may include a plurality of micro-lenses from the group consisting of concave micro-lenses and convex micro-lenses. Optionally, the micro-lens array may be formed on a plastic (e.g., transparent plastic) film.

In accordance with principles of the invention, a method of displaying a projected visible image on an interior surface of a vehicle window, entails applying an optical laminate, in accordance with the preceding paragraph, to a surface of a window. An ordinary vehicle window may be used. An image is projected from an incoherent light projector onto the optical laminate applied to the window. The image is projected from an angle of incidence relative to the optical laminate causing the optical laminate to reflect the image substantially along an angle of reflection relative to the optical laminate. The angle of reflection is towards a vehicle occupant. The projector is positioned to achieve the desired angle of reflection towards a vehicle occupant.

BRIEF DESCRIPTION OF THE DRAWINGS

The foregoing and other aspects, objects, features and advantages of the invention will become better understood with reference to the following description, appended claims, and accompanying drawings, where:

FIG. 5 is a graph illustrating intensity as a function of reflection angle according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
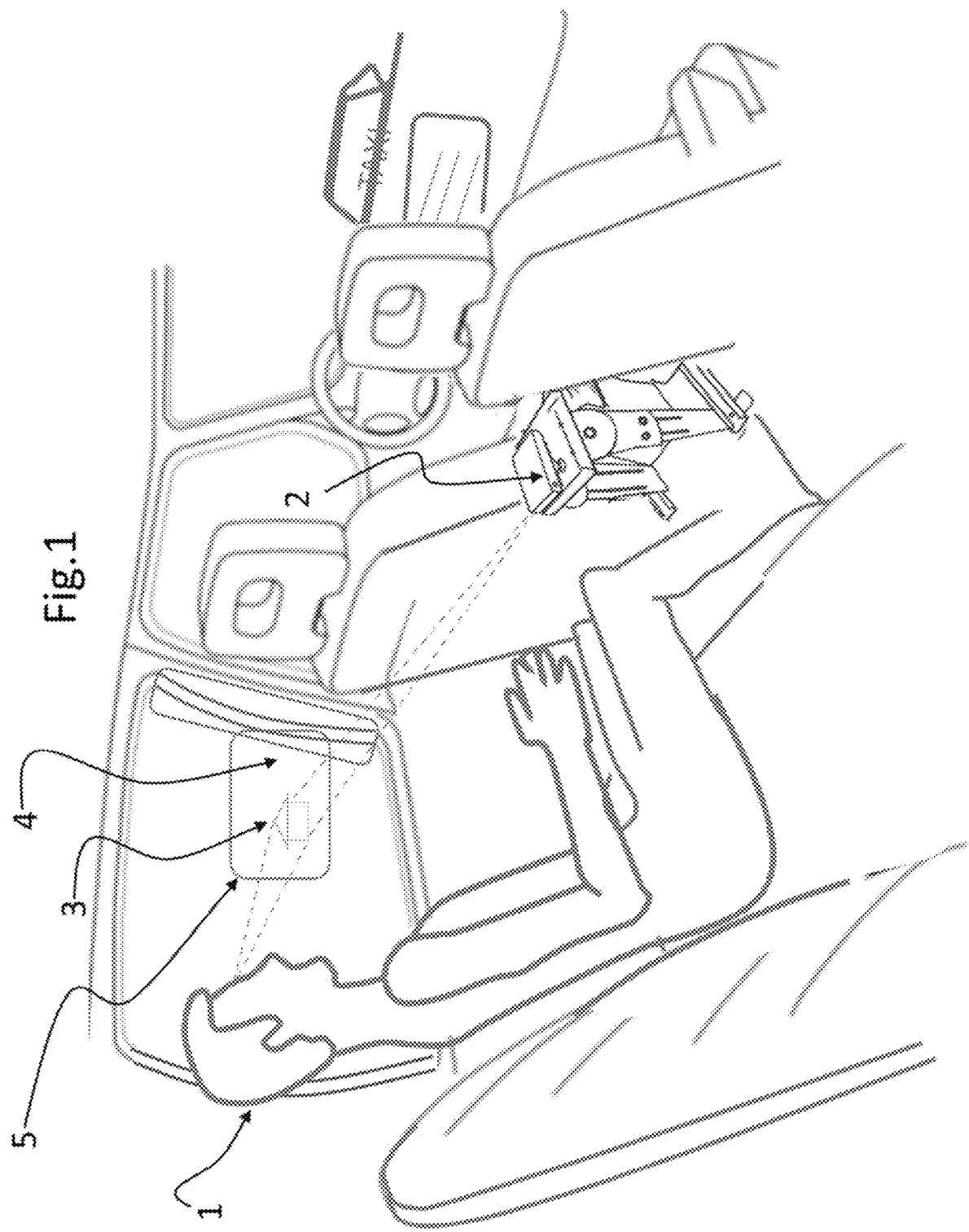
FIG. 1 is a perspective view of an exemplary projected image on a window to which an optical laminate has been applied according to principles of the invention.

Referring to FIG. 1 an image 3 is projected by a projector 2 on a vehicle window 5 coated with a structure comprised of three layers 4, the "optical structure" or "optical laminate". The image on the window is visible to a passenger 1.

The optical laminate 4 includes a photochromatic (i.e., photochromic) layer to attenuate ambient sunlight during the day and keep the window transparent and clear during the night time. Attenuation refers to a reduction of sunlight (i.e., radiation from the sun) transmitted through a window. The photochromic layer includes a photochromic coating that reacts (i.e., darkens) upon exposure to specific types of light of sufficient intensity, most commonly ultraviolet (UV) radiation. The photochromic layer is comprised of inorganic or organic photochromes, such as, but not limited to, silver chloride, spiropyrans, spirooxazines, diarylethenes, azobenzenes, or photochromic quinones.

Optionally, an electrochromic layer may be provided in lieu of a photochromic layer. The electrochromic layer facilitates light control. The electrochromic layer may comprise an electrochrome such as tungsten trioxide, tungstic anhydride or other transition metal oxides, which reversibly change color when undergoing electrochemical redox reactions precipitated by bursts of charge.

An electrochromic layer and photochromic layer are each referred to herein as a attenuation layer. The photochromic layer undergoes a reversible photochemical reaction upon exposure to certain electromagnetic radiation (e.g., UV radiation from sunlight), whereupon an absorption band in the visible part of the electromagnetic spectrum changes dramatically in strength or wavelength, yielding a noticeable tint. The electrochromic layer reversibly changes color as a result of redox reactions precipiated by an applied electric field or current. In each such layer, the tinting or color change is reversible. In each such layer, when tinted or colored, the layer limits the amount of outside ambient light that transmits through the layer.

The optical laminate 4 also includes a semi-reflective film comprised of a substrate coated with a reflective material (e.g., a metalized film). In one embodiment the substrate is polyethylene terephthalate (PET) and the coating is a thin (almost transparent) layer of aluminum. In another embodiment, the metalization is deposited on the inward facing side of the photochromic layer. The result is a mirrored surface that reflects some light and is penetrated by the rest. Light passes equally in both directions. However, when one side is brightly illuminated by a projector and the other side is darker, the darker side (i.e., the side outside of the window) becomes difficult to see from the reflection on the brightly illuminated side, because the darker side is obscured by the much brighter reflection of the illuminated side. Thus, the semi-reflective film reflects the image projected onto the window.

The optical laminate 4 also includes a micro-lens array layer. The array reflects, via total internal reflection, some of the light arriving from the projector. Total internal reflection occurs when a propagated wave strikes a medium boundary at an angle larger than a particular critical angle with respect to the normal to the surface. If the refractive index is lower on the other side of the boundary and the incident angle is greater than the critical angle, the wave cannot pass through and is entirely reflected. Other light from the projector that passes through the lens is reflected by the semi-reflective film and then focused by the lenses.

The micro-lens array layer is substantially transparent, allowing a viewer to clearly see exterior objects together with projected image. In one embodiment, the layer is comprised of an array of concave lenses etched into a substrate (e.g., a polymer substrate), e.g., by laser etching or a lithographic process. In another embodiment, convex lens dots (e.g., spherical, hemispherical, or bulbous deposits), are formed on a substrate (e.g., a polymer substrate), such as by 3D printing or a lithographic process (e.g., stereo lithography).

Figure 2:
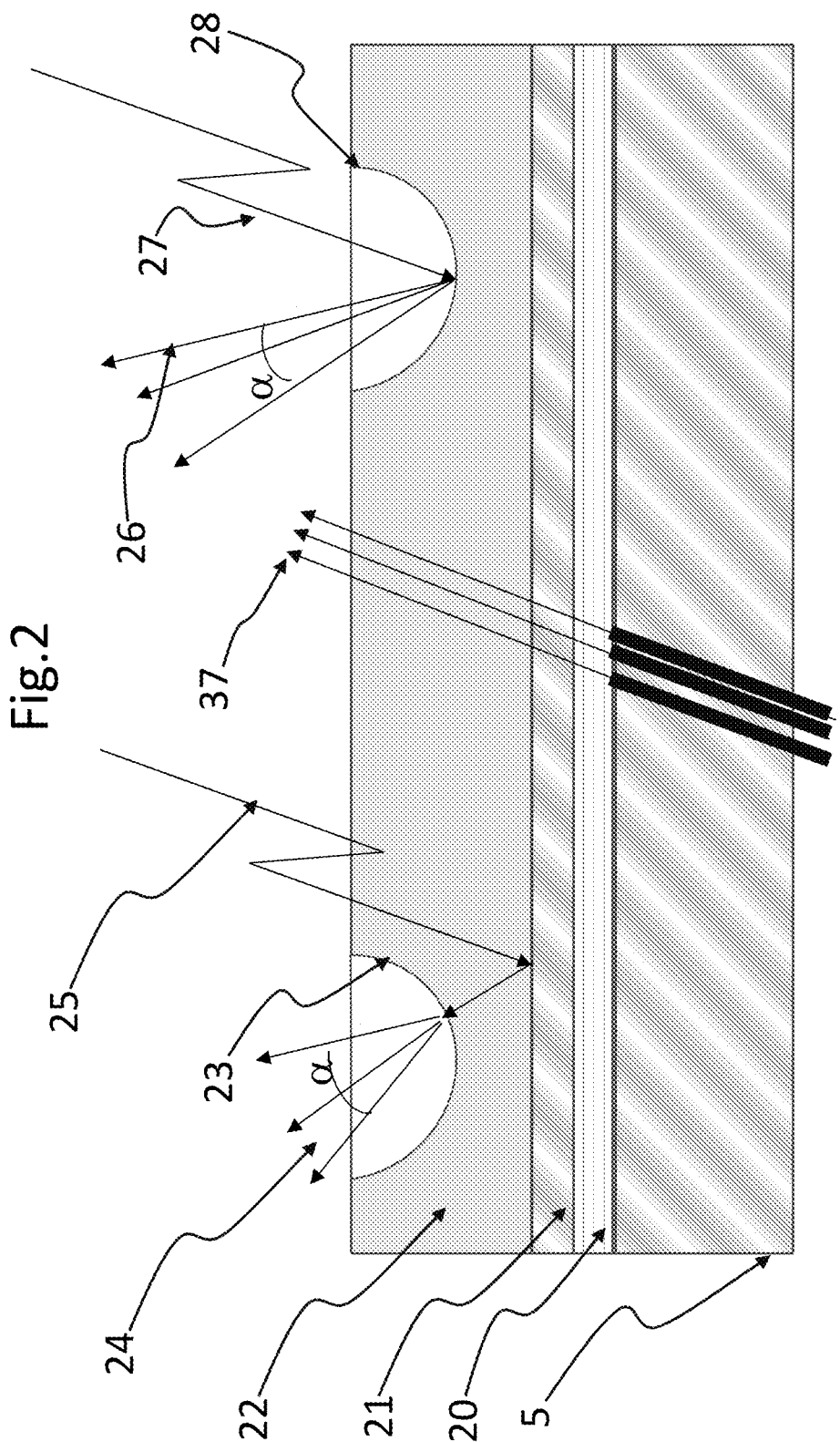
FIG. 2 is a section schematic of an optical laminate with an array of concave micro-lenses according to principles of the invention.

Referring to FIG. 2, the optical laminate is applied to the vehicle window 5 or at least to a portion of the window, according to the projected image size and the placement on the vehicle window 5. The optical laminate includes at least three layers, which are an optical attenuator photochromic or electrochromic layer 20 ("attenuation layer"), an optical semi-reflective layer 21 and a micro-lens array 22 comprised of concave lenses 23, 28. Projector beams 27 that target the lens 23 are reflected with an angle of reflection determined by the micro-lens surface 22. The angle of reflection (a) among the array of lenses is spread within a narrow range of angles 24, 26 due to surface imperfections.

Light ray beam 27 is reflected by total internal reflection (TIR) on the surface of the micro-lens. Due to surface imperfection, the beam is partly reflected due to TIR, while some of the light rays propagate toward the semi-reflective layer 21. Light rays that do not hit the concave micro-lenses 23, such as light ray 25, propagate through the micro-lens array layer 22 to the semi-reflective layer 21, where they are substantially reflected back. This reflected light-ray arrives from the back substrate side of the micro-lens array layer and, to the extent it travels through lenses, it is scattered 24. The scattering angle is determined by the curvature of the lens 23 and imperfection of the lens surface 23.

The attenuation layer 20 limits the intensity, amount, and wavelengths of ambient (outside) light 37 that passes through the laminate structure. This enhances visibility of an image projected on the laminate structure during daylight, sunny conditions.

Figure 3:
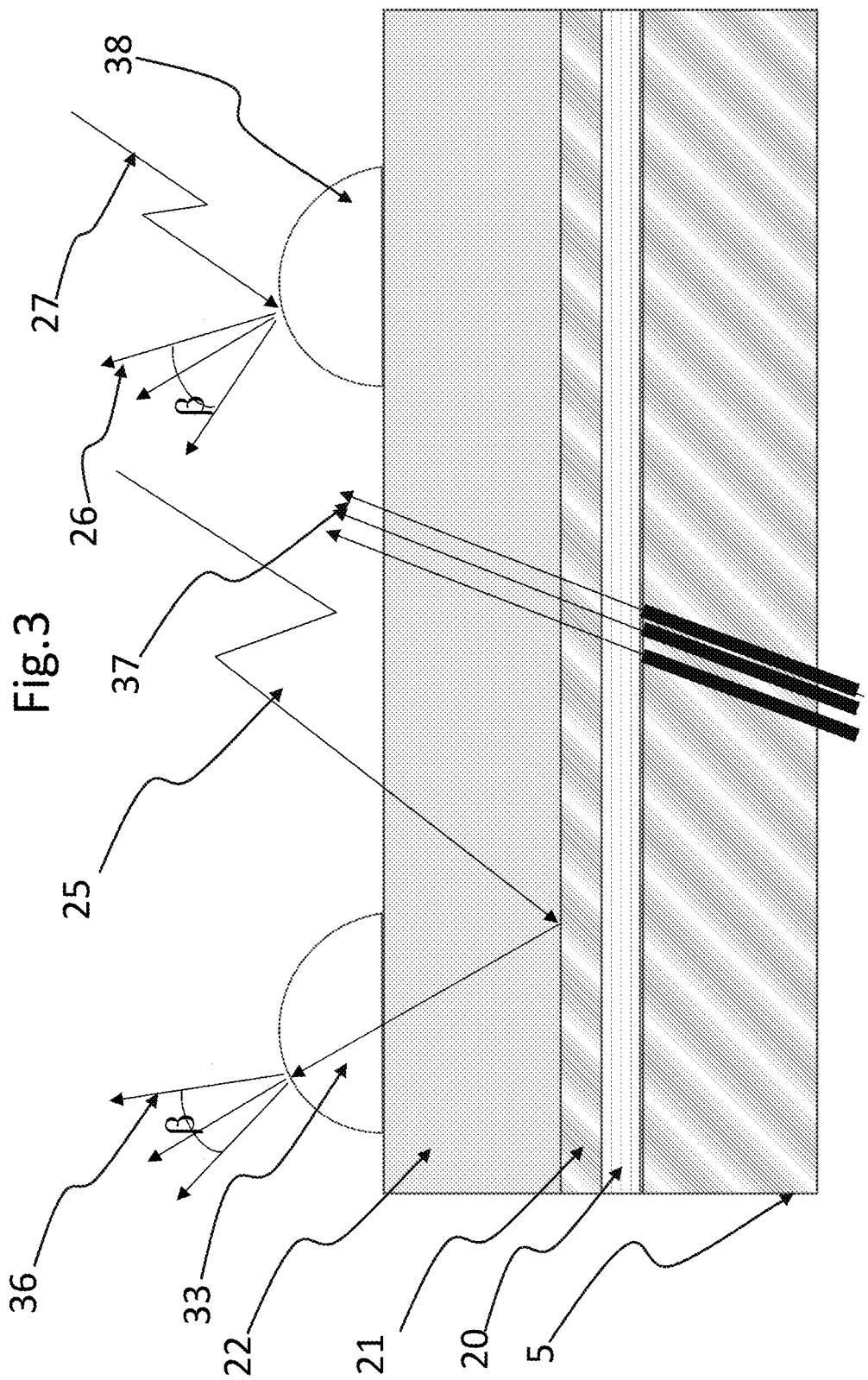
FIG. 3 is a section schematic of an optical laminate with an array of convex micro-lenses according to principles of the invention.

Referring to FIG. 3, the optical laminate is applied to the vehicle window 5 or at least part of it, according to the projected image size and placement on the vehicle window 5. The optical laminate consists of at least three layers, which are an optical attenuator photochromic or electrochromic layer 20, an optical semi-reflective layer 33 and a micro-lens array comprised of convex micro-lenses 33, 38. Projector beams 27 that hit the convex micro-lenses 38 at a reflection angle according to the convex micro-lens 33 surface due to TIR. Among the convex lenses 33, 38, the reflection angles ($\beta$) are spread across a narrow variation of angles 26, 36 due to lens curvature and surface imperfection.

Light ray beam 27 is reflected, at least in part, by total internal reflection (TIR) on the surface of the micro-lens 38. Due to surface imperfection some of the light rays propagate through the convex micro-lenses 38 toward the semi-reflective layer 21. Light rays that do not hit the micro-lenses, such as light ray 25, propagate through the micro-lens array layer 22 and are eventually reflected by the semi-reflective layer 21. These reflected light-rays arrive from the back of the convex micro-lenses 33 and are scattered 36 by the micro-lenses 33. The scattering angle 36 is determined by the curvature of the micro-lenses 33 and imperfections of the surfaces of lenses. External sunlight 37, which propagates through the window 5 is attenuated by the photochromic or electrochromic layer 20.

Figure 4:
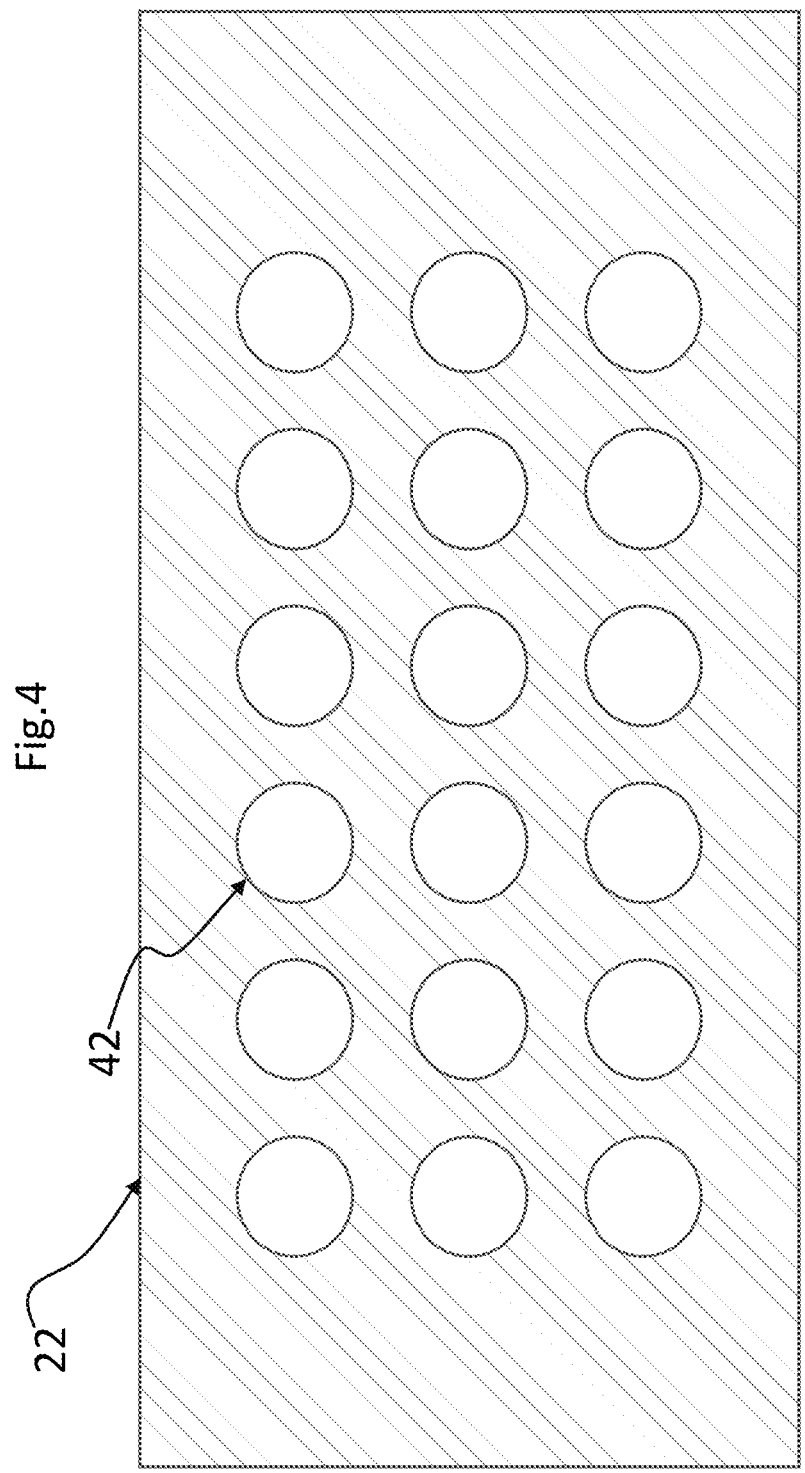
FIG. 4 is a plan schematic of an optical laminate with an array of micro-lenses according to principles of the invention.

Referring to FIG. 4, micro-lens array layer 22 consists of array micro lenses 42, which can be either concave lenses, described in FIG. 2 or convex lenses, as in FIG. 3. While FIG. 4 illustrates an array of rows and columns, the invention is not limited to any particular arrangement. An array includes any plurality of discrete microlenses.

Referring to FIG. 5, as result of the combination of the semi-reflective layer with the micro-lens array, the intensity of the reflected image as described with reference to FIG. 2 and FIG. 3 is highly dependent on the viewer angle ($\alpha$).

FIG. 5 shows two cases. The first case is an imaginary projector projecting on a white conventional screen or surface. The light intensity reflected from that surface is uniform, regardless of the angle of the viewer relative to the screen. Such light intensity is a flat line 52 in this figure.

In a vehicle exposed to external sunlight, and due to the fact that the viewer's location is predetermined by the vehicle design and seating options, the viewing angle range for a system according to the invention is relatively narrow. As a result, most of energy is concentrated in that narrow range where it will be visible to a vehicle occupant. Such narrow range is shown by a curve 51. The curve 51 shows that, at the position of the viewer, the reflected image intensity is higher than that of an imaginary conventional screen. However, the intensity of the reflected image is lower out of range of determined viewing angles. As a result of the above, the apparatus acts as a viewer angle selective diffuser.

Thus, in accordance with principles of the invention, an optical laminate is applied to a surface of a window. The optical laminate includes an attenuation layer, a semi-reflective film comprised of a substrate coated with a reflective material, and a micro-lens array. The semi-reflective layer is disposed between the attenuation layer (i.e., a photochromic and/or electrochromic layer or coating) and the micro-lens array. The attenuation layer is disposed between the surface of the window and the semi-reflective film. The photochromic layer may include a photochrome from the group consisting of silver chloride, spiropyrans, spirooxazines, diarylethenes, azobenzenes, and photochromic quinones. The electrochromic layer may include an electrochrome from the group consisting of tungsten trioxide, tungstic anhydride and another transition metal oxide. The semi-reflective layer may include a thin layer of reflective metal on a plastic film. The micro-lens array may include a plurality of micro-lenses from the group consisting of concave micro-lenses and convex micro-lenses. Optionally, the micro-lens array may be formed on a plastic (e.g., transparent plastic) film.

In accordance with principles of the invention, a method of displaying a projected visible image on an interior surface of a vehicle window, entails applying an optical laminate, in accordance with the preceding paragraph, to a surface of a window. An ordinary vehicle window may be used. An image is projected from an incoherent light projector onto the optical laminate applied to the window. The image is projected from an angle of incidence relative to the optical laminate causing the optical laminate to reflect the image substantially along an angle of reflection relative to the optical laminate. The angle of reflection is towards a vehicle occupant. The projector is positioned to achieve the desired angle of reflection towards a vehicle occupant.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An optical laminate applied to a surface of a window, the optical laminate including an attenuation layer, a semi-reflective film comprised of a substrate coated with a reflective material, and a micro-lens array, the semi-reflective layer being disposed between the attenuation layer and the micro-lens array, and the attenuation layer being disposed between the surface of the window and the semi-reflective film, and the attenuation layer comprising one of a photochromic coating and an electrochromic coating.

2. The optical laminate applied to a surface of a window according to claim 1, the attenuation layer comprising a photochromic layer, the photochromic layer comprising a photochrome from the group consisting of silver chloride, spiropyrans, spirooxazines, diarylethenes, azobenzenes, and photochromic quinones.

3. The optical laminate applied to a surface of a window according to claim 2, the semi-reflective layer comprising a thin layer of reflective metal on a plastic film.

4. The optical laminate applied to a surface of a window according to claim 3, the micro-lens array comprising a plurality of micro-lenses from the group consisting of concave micro-lenses and convex micro-lenses.

5. The optical laminate applied to a surface of a window according to claim 4, the micro-lens array comprising a plurality of micro-lenses formed on a plastic film.

6. The optical laminate applied to a surface of a window according to claim 1, the attenuation layer comprising an electrochromic layer, the electrochromic layer comprising an electrochrome from the group consisting of tungsten trioxide, tungstic anhydride and another transition metal oxide.

7. The optical laminate applied to a surface of a window according to claim 6, the semi-reflective layer comprising a thin layer of reflective metal on a plastic film.

8. The optical laminate applied to a surface of a window according to claim 1, the semi-reflective layer comprising a thin layer of reflective metal on a plastic film.

9. The optical laminate applied to a surface of a window according to claim 8, the micro-lens array comprising a plurality of micro-lenses from the group consisting of concave micro-lenses and convex micro-lenses.

10. The optical laminate applied to a surface of a window according to claim 9, the micro-lens array comprising a plurality of micro-lenses formed on a plastic film.

11. The optical laminate applied to a surface of a window according to claim 1, the micro-lens array comprising a plurality of micro-lenses from the group consisting of concave micro-lenses and convex micro-lenses.

12. The optical laminate applied to a surface of a window according to claim 1, the micro-lens array comprising a plurality of micro-lenses formed on a plastic film.

13. The optical laminate applied to a surface of a window according to claim 1, the semi-reflective film comprising a thin layer of reflective metal on a plastic film.

14. A method of displaying a projected visible image on an interior surface of a vehicle window, said method comprising steps of:
    applying an optical laminate to a surface of a window, the optical laminate including a attenuating layer, a semi-reflective film comprised of a substrate coated with a reflective material, and a micro-lens array, the semi-reflective layer being disposed between the attenuating layer and the micro-lens array, and the attenuating layer being disposed between the surface of the window and the semi-reflective film, and the attenuation layer comprising one of a photochromic coating and an electrochromic coating; and
    projecting an image from an incoherent light projector onto the optical laminate applied to the window, the image being projected from an angle of incidence relative to the optical laminate thereby causing the optical laminate to reflect the image substantially along an angle of reflection relative to the optical laminate, the angle of reflection being towards a vehicle occupant.

15. The method of claim 14, the attenuation layer comprising a photochromic layer, the photochromic layer comprising a photochrome from the group consisting of silver chloride, spiropyrans, spirooxazines, diarylethenes, azobenzenes, and photochromic quinones.

16. The method of claim 14, the attenuation layer comprising an electrochromic layer, the electrochromic layer comprising an electrochrome from the group consisting of tungsten trioxide, tungstic anhydride and another transition metal oxide.

17. The method of claim 14, the semi-reflective layer comprising a thin layer of reflective metal on a plastic film.

18. The method of claim 17, the micro-lens array comprising a plurality of micro-lenses from the group consisting of concave micro-lenses and convex micro-lenses.

* * * * *